United States Patent [19]
Thomas

[11] 3,964,693
[45] June 22, 1976

[54] COUNTERBALANCED DOOR MECHANISM FOR TELLER CARRIER RECEIVE TUBE OF A PNEUMATIC BANKING SYSTEM

[76] Inventor: William D. Thomas, c/o LeFebure Corporation, 308-29th St., NE., Cedar Rapids, Iowa 52406

[22] Filed: Dec. 23, 1974

[21] Appl. No.: 535,178

[52] U.S. Cl. .................................. 243/24; 243/19
[51] Int. Cl.² ......................................... B65G 51/30
[58] Field of Search ............... 243/1, 19, 20, 23, 24, 243/38

[56] References Cited
UNITED STATES PATENTS

| | | | |
|---|---|---|---|
| 676,050 | 6/1901 | Sheppard | 243/24 |
| 680,698 | 8/1901 | Cowley | 243/24 |
| 2,353,870 | 7/1944 | Blume | 243/23 X |
| 3,601,337 | 8/1971 | Bullock | 243/24 |
| 3,659,809 | 5/1972 | Cook | 243/19 |
| 3,790,102 | 2/1974 | Tearne | 243/19 |
| 3,841,584 | 10/1974 | Robinson | 243/19 |
| 3,851,843 | 12/1974 | Sandlin | 243/19 |

FOREIGN PATENTS OR APPLICATIONS 1,286,461 1/1969 Germany .............................. 243/24

Primary Examiner—Evon C. Blunk
Assistant Examiner—James L. Rowland

[57] ABSTRACT

A vertical carrier receiving tube at the teller station in a pneumatic tube system for banking is provided with a door upon which the carrier arrives from the customer kiosk station. The door is counterbalanced so that upon arrival of the carrier its weight opens the door to display the carrier and upon its removal the door automatically recloses, thus eliminating the need for any motor drive to open and close the door.

5 Claims, 4 Drawing Figures

COUNTERBALANCED DOOR MECHANISM FOR TELLER CARRIER RECEIVE TUBE OF A PNEUMATIC BANKING SYSTEM

BACKGROUND OF THE INVENTION

U.S. Pat. No. 3,841,584 discloses a pneumatic tube system for motor banking in which the teller receive tube is vertically disposed and provided with a door upon which the carrier arrives from the customer kiosk. The door is opened to display the carrier by means of an appropriate linkage and electric motor which is energized by a switch on the door closed by the presence of the carrier. When the carrier is removed from the door, the switch energizes the motor to reclose the door.

SUMMARY OF THE INVENTION

The present invention involves a simplification of the pneumatic tube system just described which reduces both its structure and cost while increasing its reliability. Instead of a motor and attendant linkage and switches to positively open and close the door in the teller receive tube, the weight of the carrier itself is used. The door is counterbalanced so that it remains closed when no carrier is present on it but opens when the carrier arrives, the weight of the latter overcoming the counterbalancing. Upon removal of the carrier, the counterbalancing recloses the door.

DETAILED DESCRIPTION OF THE PREFERRED EMBODIMENT

Figure 1:
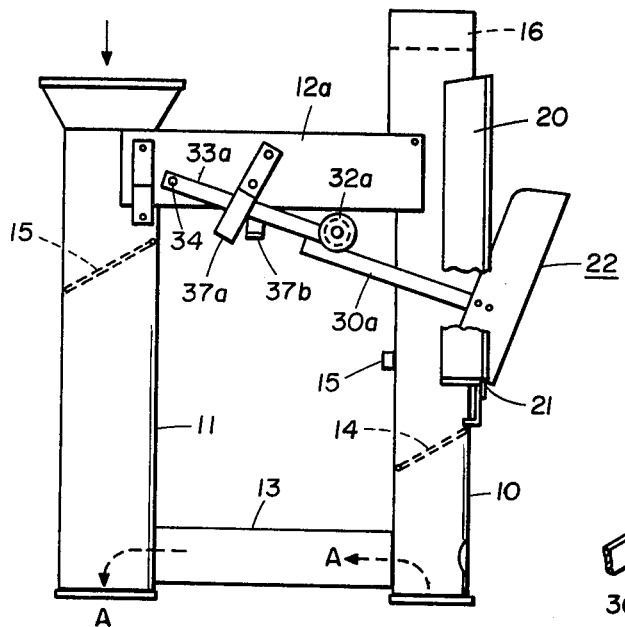
FIG. 1 is a side elevation somewhat diagrammatically illustrating the send and receive tubes at the teller station with the present invention incorporated into the receive tube, the door of the latter being shown in its open position.
Figure 2:
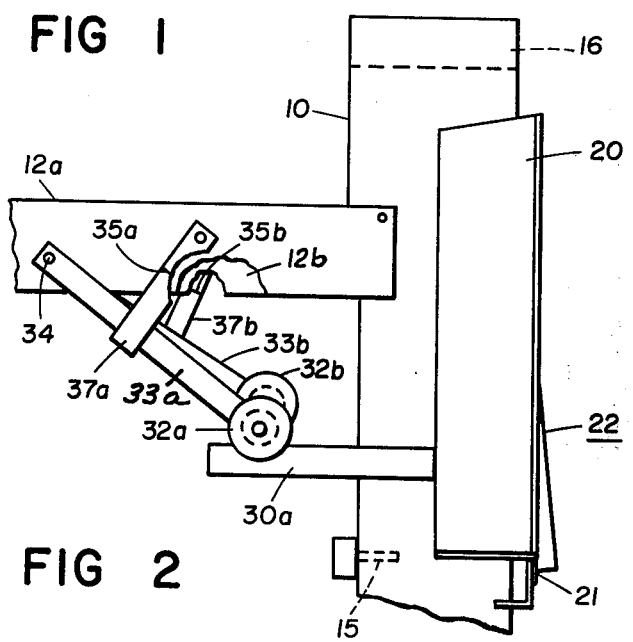
FIG. 2 illustrates a portion of FIG. 1 but with the door in its closed position, portions being broken away to illustrate certain details of the structure.

Referring first to FIG. 1, the teller receive and send tubes 10 and 11 are vertically disposed at the teller station and exteriorly interconnected adjacent their top ends by a pair of cross plates 12a and 12b (see FIG. 2). A conduit 13 interiorly interconnects the tubes 10 and 11 below the plates 12 and between the latter and the conduit 13 suitable receive and send valves, indicated at 14 and 15, are located in the tubes 10 and 11. Air is circulated through the tubes 10 and 11 and the conduit 13 by a blower (not shown) as indicated by the arrows A, all in well-known fashion. A carrier C arrives up the receive tube 10, passes the valve 14 and a stop 15 in the tube 10 which pivots aside so that the carrier can continue up until it strikes a cushion 16 at the roof of the tube 10. The carrier C then falls back down where it comes to rest on the stop 15 and, owing to the latter, falls somewhat toward the portion of the tube 10 opposite the stop 15.

Figure 4:
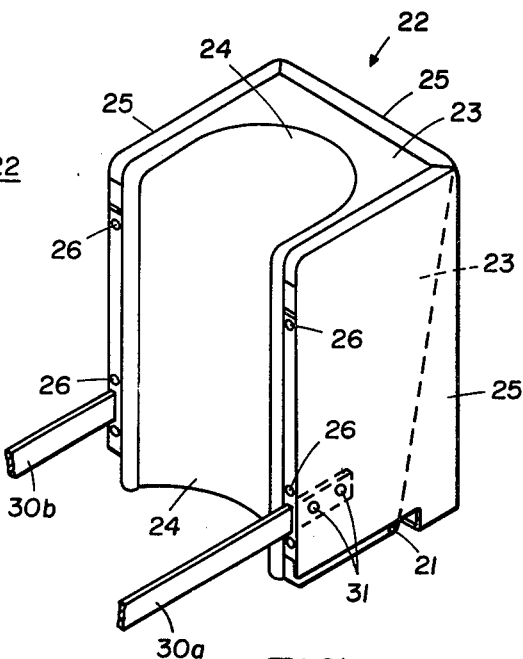
FIG. 4 is an isometric view of the interior of the door itself and other details of its structure.
Figure 3:
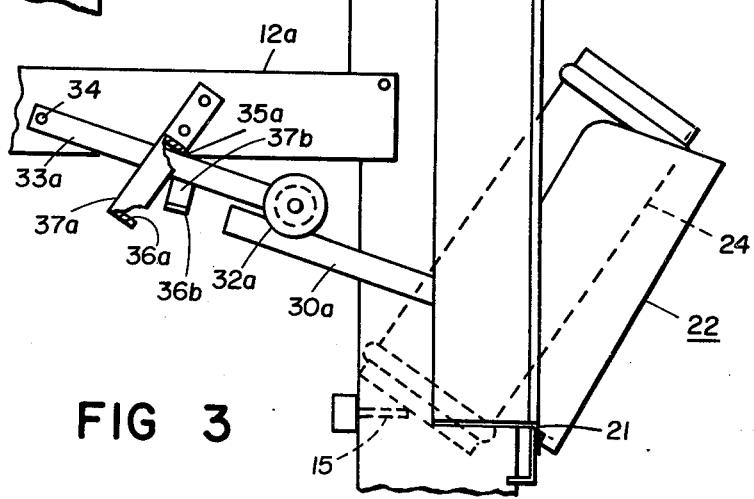
FIG. 3 is similar to FIG. 2 but shows the door open as the result of the arrival of a carrier on it.

At the latter point, the tube 10 is apertured to provide a vertically elongated opening sufficient so that the carrier C can be extracted from the tube 10, which opening is surrounded by a molded door housing 20 at the adjacent ends of the cross plates 12. To the lower edge of the housing 20 is horizontally hinged at 21 the lower end of the teller door, generaly indicated at 22. The latter comprises an inner liner 23 molded from suitable plastic material to provide an inwardly facing, vertically extending arcuate carrier recess 24 whose depth at its top is greater than that at its bottom, as indicated in FIGS. 3 and 4. It is into the recess 24 that the carrier "leans" from the stop 15 when the door 22 is closed as in FIG. 2. The rear and sides of the door liner 23 are finished off by an outer, box-like cover 25, formed of sheet metal, secured at 26 about its edges to the corresponding edges of the liner 23.

Control of the door is accomplished by a counterbalancing arrangement which includes a pair of parallel arms 30a and 30b attached at one end at 31 to the inner faces of the sides of the door cover 25. The arms 30 extend forwardly through slots in the rear of the door housing 20 and straddle the receive tube 10 below the cross plates 12. The tops of the arms 30 adjacent their other ends receive a pair of grooved rollers 32a and 32b journaled at the ends of a pair of swinging arms 33a and 33b horizontally pivoted at 34 to the sides of the cross plates 12 as shown in FIG. 1 – 3. The swing of the arms 33a, 33b is limited by upper and lower offsets 35a, 35b and 36a, 36b in brackets 37a and 37b which depend from the plates 12 (see FIG. 3 particularly). The lower offsets 36a and 36b are arranged so that when the door 22 is closed the roller 32a is in contact with the arm 30a but the roller 32b is held above the arm 30b by the lower offset 36b until the door 22 is partly opened (compare FIG. 2 with FIGS. 1 and 3). The parts 30a, 32a and 33a are thus arranged so that, in the absence of a carrier C on the door 22, their combined weight maintains the door 22 closed as in FIG. 2, but when a carrier C arrives and "leans" from the stop 15 against the door recess 24, its weight is enough to lift the arm 30a, roller 32a and arm 33a so that the door 22 tilts outwardly until the center of gravity of the door 22 and the carrier C shifts sufficiently outward of the hinge 21, at which point the arm 30b picks up the roller 32b and arm 33b. The door 22 and carrier C then continue to tilt outwards until the arms 33 are arrested by the upper offsets 35, as shown in FIGS. 1 and 3, so that the carrier C is presented to the teller. When the carrier 10 is removed, the combined weight of the arms 30, rollers 32 and arms 33 swing the door 22 shut. All the foregoing, it is clear, is positively accomplished without the need of any door motor and its attendant limit switches and likage, and thus is as inexpensive and reliable as it is simple. If desired, one of the arms 33 can also operate a switch (not shown) to turn the blower off when the carrier C has arrived and the door 22 is open.

Though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:

1. In the teller station of a pneumatic tube system for banking and the like including a carrier receive assembly having a carrier receive tube with a vertically disposed portion, an aperture in the side wall of said tube portion for removal of a carrier from the tube, a generally vertically disposed door hinged at its lower edge normally closing said aperture, and a stop to arrest a received carrier in a generally vertically disposed attitude in the tube so that the carrier is in a tilted position against the door, the improvement comprising: counterbalance means connected to the door, the counterbalance means including lifting means extending generally horizontally from the door and past the receive tube when the door is closed, the lifting means moving in a generally vertical plane upon opening and closing movement of the door, and weighted means carried by the carrier receive assembly effective to be engaged and raised by the lifting means, the structure of the door and the location of its hinge being effective so that the weight of a carrier when in said position against the door overcomes the counterbalance means and swings the door with the carrier thereon to an open position for removal of the carrier by a teller, the lifting means and the weighted means being thereafter effective to return the door to its closed position upon removal of the carrier from the door by the teller.

2. The device of claim 1 wherein the lifting means includes a first pair of arms fixed at one end to the door and straddling the receive tube, and the weighted means includes a second pair of arms pivoted at one end to the carrier receive assembly for movement in generally vertical planes, the other ends of the second arms carrying a pair of rollers journaled thereon effective to be engaged and lifted as aforesaid by the other ends of the first arms.

3. The device of claim 2 wherein a first one only of the rollers engages one only of the first arms to maintain the door in its closed position, the remaining roller engaging the remaining first arm only when a carrier is in said position against the door and the center of gravity of the door and the carrier has moved outwardly of the door hinge during opening movement of the door as aforesaid.

4. The device of claim 3 including a second stop carried by the receive assembly effective to retain said first one of the rollers and its associated one of the second arms out of engagement with said one of the first arms when the door is in its closed position as aforesaid.

5. The device of claim 4 including a pair of brackets secured to the receive assembly, the brackets including a pair of upper offsets effective to engage the second arms to limit the extent of their upward movement and thereby the opening extent of the door and a pair of lower offsets effective to engage the second arms to limit the extent of their downward movement, one of the lower offsets constituting the second stop.

* * * * *